United States Patent
Zaffino et al.

(10) Patent No.: US 8,367,962 B2
(45) Date of Patent: Feb. 5, 2013

(54) AUTOMATED WELDING OF MOULDS AND STAMPING TOOLS

(75) Inventors: Pascal Zaffino, Windsor (CA); Jan Paul Huissoon, West Montrose (CA); David Marentette, Chatham (CA)

(73) Assignee: Ariel Andre Waitzman, Franklin, MI (US)

( * ) Notice: Subject to any disclaimer, the term of this patent is extended or adjusted under 35 U.S.C. 154(b) by 1502 days.

(21) Appl. No.: 11/924,649

(22) Filed: Oct. 26, 2007

(65) Prior Publication Data

US 2009/0107961 A1    Apr. 30, 2009

(51) Int. Cl.
  B23K 9/04    (2006.01)
(52) U.S. Cl. .............. 219/76.1; 219/76.14; 228/102; 228/103
(58) Field of Classification Search .............. None
  See application file for complete search history.

(56) References Cited

U.S. PATENT DOCUMENTS

| | | | | |
|---|---|---|---|---|
| 3,185,814 | A | * | 5/1965 | Rossner et al. ............ 219/76.14 |
| 4,237,361 | A | * | 12/1980 | Zwintscher et al. ......... 219/76.1 |
| 4,322,922 | A | * | 4/1982 | Gilliam ............................ 451/56 |
| 4,365,133 | A | * | 12/1982 | Inoue ......................... 219/69.17 |
| 4,801,781 | A | | 1/1989 | Hori et al. |
| 4,831,235 | A | * | 5/1989 | Kishi et al. ............... 219/125.12 |
| 4,835,362 | A | * | 5/1989 | Nakashima et al. ....... 219/130.1 |
| 4,869,417 | A | * | 9/1989 | Moriki ............................... 228/7 |
| 4,959,523 | A | * | 9/1990 | Fihey et al. .............. 219/124.34 |
| RE35,756 | E | * | 3/1998 | Schneebeli et al. ........ 219/76.14 |
| 5,770,834 | A | | 6/1998 | Davis et al. |
| 5,789,717 | A | | 8/1998 | Imaizumi et al. |
| 5,833,126 | A | * | 11/1998 | Wark et al. .......................... 228/7 |
| 5,914,055 | A | * | 6/1999 | Roberts et al. ............. 219/76.15 |
| 6,414,258 | B1 | * | 7/2002 | Amano ...................... 219/76.14 |
| 6,841,752 | B2 | | 1/2005 | Ward |
| 7,927,653 | B2 | * | 4/2011 | Hasegawa et al. ............ 427/142 |

FOREIGN PATENT DOCUMENTS

| | | |
|---|---|---|
| CA | 2 480 569 | 3/2003 |
| EP | 0 194 045 | 9/1986 |
| EP | 0 803 309 | 10/1997 |
| EP | 1 080 818 | 3/2001 |
| EP | 1 459 831 | 9/2004 |
| EP | 1 555 080 | 7/2005 |
| JP | 62-013294 A | * 1/1987 |

(Continued)

OTHER PUBLICATIONS

Machine translation of JP-2002-219567A (no date).*

(Continued)

*Primary Examiner* — Kiley Stoner
(74) *Attorney, Agent, or Firm* — Carlson, Gaskey & Olds, P.C.

(57) ABSTRACT

A tool welding system is disclosed that includes a table that heats a tool. A multi-axis robot includes a welding head that is moved relative to the table in response to a command. A controller is in communication with the robot and generates the command in response to welding parameters. The weld parameters are based upon a difference between an initial tool shape and a desired tool shape. The difference between the initial tool shape and the desired tool shape corresponds to a desired weld shape. The desired weld shape is adjusted based upon initial tool shape variations, which includes thermal growth of the tool. The tool is welded to provide the desired weld shape to achieve a desired tool shape.

10 Claims, 3 Drawing Sheets

FOREIGN PATENT DOCUMENTS

| | | | |
|---|---|---|---|
| JP | 2001-232469 A | * | 8/2001 |
| JP | 2002-219567 A | * | 8/2002 |
| WO | 03/095135 | | 5/2003 |

OTHER PUBLICATIONS

Wu et al., "Weld bead placement system for multipass welding," Institution of Electrical Engineers, Proc.-Sci. Meas. Technol., vol. 143, No. 2, Mar. (1996), pp. 85-90.

Sun, "Application of Precision Welding in Die and Mould Repair," Int. J for the Joining of Materials 14(3/4) Dec. (2002), pp. 56-61.

Miyamoto et al., "Freeform Fabrication of Titanium by 3D Micro Welding," Welding Research Institute of Osaka University, vol. 33, No. 1, Sep. (2004), pp. 33-38.

Ericsson et al., "Three Dimensional Simulation of Robot path, Heat Transfer and Residual Stresses of a welded Part with Complex Geometry," Int. J for the Joining of Materials 17(2), Jun. (2005), pp. 42-52.

Menaka et al., "Estimating bead width and depth of penetration during welding by infrared thermal imaging," British Institute of Non-Destructive Testing, vol. 47, Issue No. 9, Sep. (2005), pp. 564-568.

Ericsson, Mikael, "Simulation of robotic TIG-welding," Department of Technology, University of Trollhattan/Uddevalla, Sweden, 2003.

Siminski, Michael, BE (Mech), "Weld Path Optimisation for Rapid Prototyping and Wear Replacement by Robotic Gas Metal Arc Welding," thesis submitted for Doctor of Philosophy (PhD) degree, University of Wollongong, 2003.

Jandric et al., "Optimization of Welding Parameters for GTAW Based Rapid Manufacturing," 6th International Trends in Welding Research Conference Proceedings, Apr. 15-19, 2002, Pine Mountain, GA, ASM International, (2003), pp. 392-397.

Suga et al., "Measurement of Molten Pool Shape and Penetration Control Applying Neural Network in TIG Welding of Thin Steel Plates," ISIJ International, vol. 39, No. 10, (1999), pp. 1075-1080.

Smith et al., "Real-time top-face vision based control of weld pool size," Industrial Robot: An International Journal, vol. 32, No. 4 (2005), pp. 334-340.

Shacklock et al., "Precision Weld Build-Up With a Multi-Axis Robotic System," International Institute of Welding, Asian Pacific International Congress, Oct. 29-Nov. 1, 2002.

Ribeiro, Fernando, "3D Printing with Metals," Computing & Control Engineering Journal, Feb. 1998, pp. 31-38.

Canada Institute for Scientific and Technical Information, "Information Search," Mar. 2006.

* cited by examiner

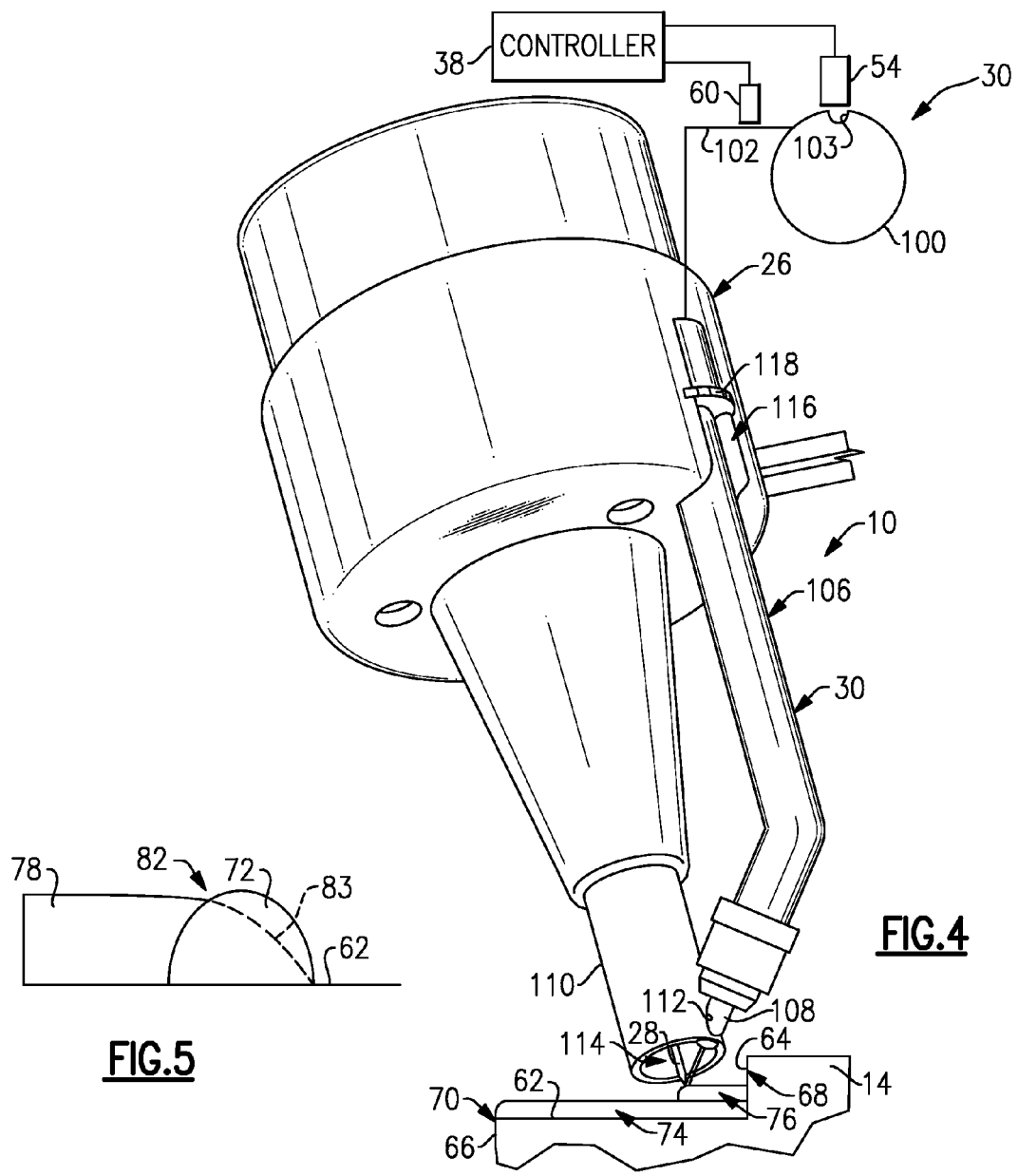

AUTOMATED WELDING OF MOULDS AND STAMPING TOOLS

BACKGROUND

This disclosure relates to a method and system for welding tools such as those used for moulding and stamping. More particularly, the disclosure relates to a method and system for welding additional material onto a tool to be reworked, for example, for subsequent use in producing products in need of a class A surface.

Tools, such as stamping tools and plastic injection moulds, must be welded for a variety of reasons. During the repair of tools for cracks or wear, it is often necessary to grind out material and then build up the ground surface to provide new material. The newly welded material is then partially machined away to create a new surface that matches the required design surface.

Additionally, there are occasionally part changes that deviate from the initial part design. Part changes require a corresponding change in the tool. If this change involves only the removal of material from the tool, then material can be simply machined away. If however the part design change requires addition of material to the surface of the tool, as it typically does, then additional material must be added to the desired area. This is accomplished through the application of successive layers of weld material until the required thickness of material is added prior to machining. The required thickness of material may be as high as 2 inches (50 mm) requiring numerous layers of weld material to be applied.

Because of the high surface quality required for many tool surfaces (particularly those being built to Class A automotive standards), and the additional risk of distortion of the welded surface, the tool must be welded using tungsten inert gas (TIG) welding at an elevated temperature of approximately 700° F. (370° C.). When such welding is carried out using manual techniques, the welder must be provided with protective gear and suitable cooling when working in this very harsh environment. Often the tool can only be heated to approximately 400° F. (210° C.), which is less than desired, to accommodate the welder.

Robotic welding has been experimented with in various fields of industry. For example, robotic welding systems for rapid prototyping have been suggested. Such systems have been very conceptual in nature and do not lend themselves to the unique environment and challenges of welding tools that require class A surfaces. These large tools, typically weighing several tons, thermally expand as much as a half an inch (12 mm) or more as they are heated.

A typical application in tool modification is to build up a rectangular, circular, triangular, or arbitrarily shaped area on the surface on the tool. This is accomplished by laying down parallel passes of weld metal on the area to be built up and then repeating this process to build up multiple layers, one at a time, until the required metal thickness is achieved. This is a very time consuming process and requires the investment of substantial man hours of welding in order to achieve the required surface shape. A highly skilled tool welder can typically only weld about a half a pound of material per hour. The boundary of the manually welded area typically varies such that a more than desired amount of welded material must be removed during final machining. This is because a typical welder cannot achieve and maintain the contour of the outer boundary throughout the welding process. Manual welders sometimes weld a perimeter as a guide so that they more accurately lay down the desired weld shape to the area.

What is needed is an automated welding method and system that is suitable for tool welding in heated environments.

SUMMARY

A tool welding system is disclosed that includes a table having burners in communication with a fuel source. The table heats a tool to a desired temperature, which enables better surface matching needed to produce a class A surface. A multi-axis robot includes a welding head that is moved relative to the table in response to a command. A controller is in communication with the robot and generates the command in response to welding parameters. The weld parameters are based upon a difference between an initial tool shape and a desired tool shape. The tool is probed in some fashion, in one example, to correlate the initial tool shape data to the tool's position on the table. The difference between the initial tool shape and the desired tool shape corresponds to a desired weld shape that represents the material that will be welded onto the tool. The desired weld shape, which consists of multiple passes or layers, is adjusted based upon initial tool shape variations, which includes thermal growth of the tool. The tool is welded to provide the desired weld shape to achieve the desired tool shape. In one example, the perimeter of the desired weld shape in each pass is welded first and then filled in by additional adjoining weld beads. Adjustments are made throughout the welding process based upon variations in the weld beads and tool.

These and other features of the application can be best understood from the following specification and drawings, the following of which is a brief description.

BRIEF DESCRIPTION OF THE DRAWINGS

FIG. 3 is a schematic view of one pass or layer of a desired weld shape applied to an initial tool shape to achieve a desired tool shape.

FIG. 4 is a schematic view of a welding head and feed system in the process of welding the tool.

FIG. 5 is a enlarged view of a portion of a perimeter weld bead and an adjoining weld bead.

DETAILED DESCRIPTION OF THE PREFERRED EMBODIMENT

Figure 1:
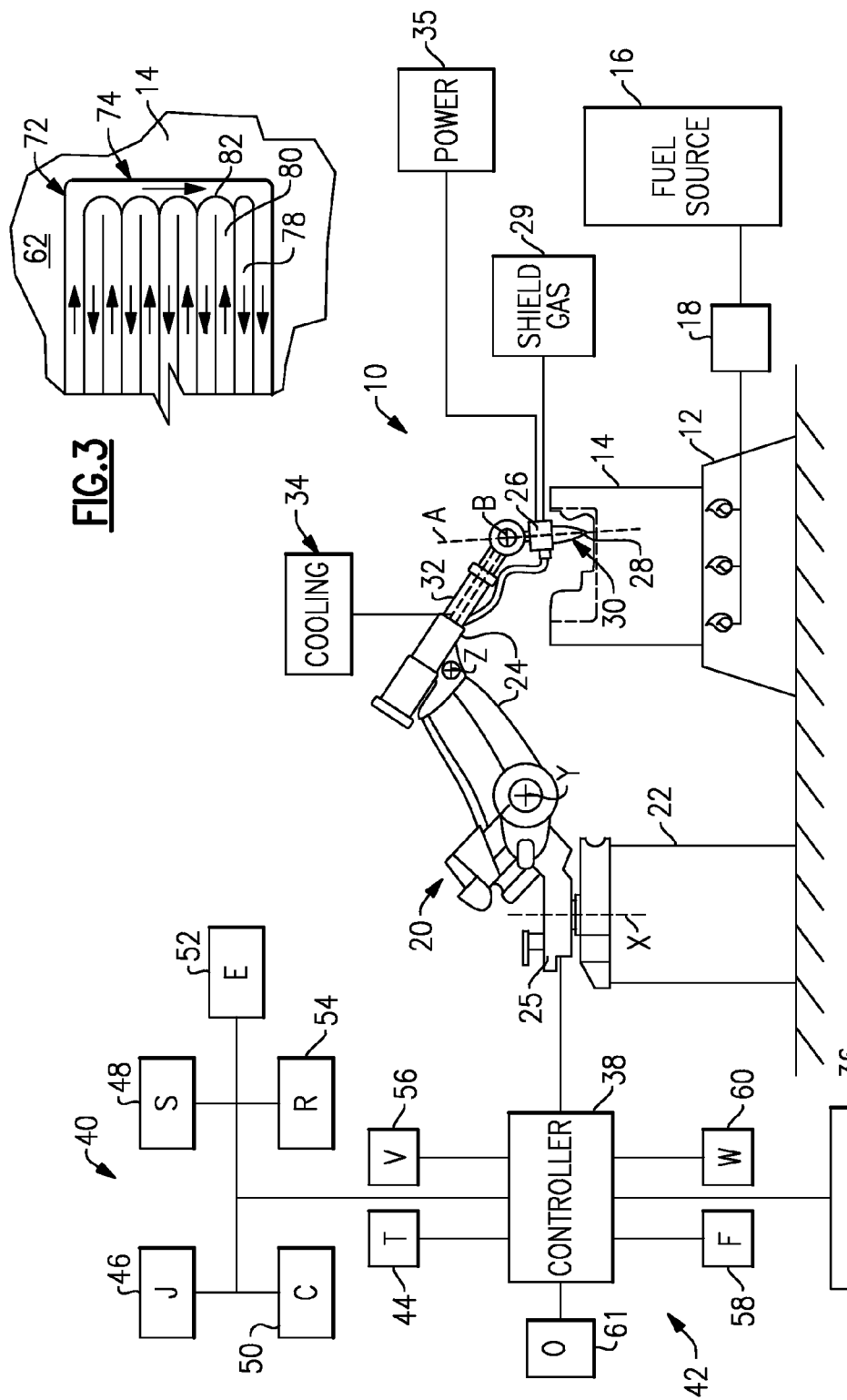
FIG. 1 is a highly schematic view of an example tool welding system.

A welding system 10 is schematically shown in FIG. 1. The system 10 includes a table 12 that supports a tool or mould 14 that is to be reworked by adding welded material to its surfaces. In one example, the table 12 is connected to a fuel source 16 that provides fuel to burners in the table 12 to heat the mould 14 to temperatures of at least approximately 400° F., in one example, and as much as 700° F. or more in another example. A heater control system 18 is associated with the table 12 and the fuel source 16 to regulate the heat provided by the table 12 with valves and additional hardware and/or software. The mould 14 can also be heated using an electric heat source, for example.

A multi-axis robot 20 is arranged atop a pedestal 22 near the table 12. The robot 20 includes a base 25 mounted to the pedestal 22 and arms 24 that support a welding head 26. In one example, the welding head 26 is a gas tungsten arc welding (GTAW) configuration having a electrode 28. A wire feeder 30, which is schematically shown in FIG. 1, continuously supplies wire to the electrode 28, which is transformed into plasma in response to a current from a power source 35. A shielding gas 29 is connected to the welding head 26 to shield the welding site, as is known.

In one example, the robot 20 is a five axis device. The arms 24 rotate together relative to the base 25 about an axis X. The arms 24 pivot about independent axes Y and Z. The welding head 26 is rotatable about an axis A and pivots relative to an end of one of the arms 24 about an axis B. In this manner, the position of the electrode 28 can be manipulated in a highly accurate manner. In the example shown, the robot 20 is positioned above the table 12 to minimize any positional translation errors that are more likely to occur with the welding head near the extremity of its reach.

The accuracy of the robot 20 can be adversely affected by heat from the table 12 and mould 14. Accordingly, it may be desirable to provide cooling passages 32 within various components of the robot 20 that are in communication with a cooling system 34. Cooling the robot 20 prevents the temperature of the sensitive components of the robot from exceeding a predetermined temperature, or to minimize thermal growth of the robot.

The system 10 also includes a controller 38 that is in communication with a variety of components for calculating and achieving a desired weld shape to produce a desired tool shape corresponding to the reworked initial tool shape. The controller 38 may include hardware and software that can be integrated or separated into modules. The controller 38 is in communication with a CAD database 36. The CAD database 36 may include, for example, three dimensional data that provides the initial tool shape of the mould 14 in need of rework. The CAD database 36 may also include a desired tool shape, which corresponds to the desired shape of the reworked mould. The controller 38 is programmed to compare the data relating to the initial and desired tool shapes to determine a desired weld shape. The controller 38 interrelates the robot coordinate system and the mould dimensional information, which allows the coordinates of the CAD database 36 to be used in generating the robot welding paths. The desired weld shape represents the weld that will be laid down on the mould 14 to rework it. The desired weld shape will typically be broken into multiple welding passes or layers that are laid on top of one another.

The controller 38 determines weld parameters 40 based upon a comparison of the initial and desired tool shapes. Some of the welding parameters 40 may be determined by one or more manually input values from a system operator. For example, the operator may input desired pounds of welded material per hour. The welding parameters 40 include, for example, electrode trajectory 46, welding speed 48, current 50, electrode orientation 52 and wire feed rate 54. Parameters such as welding speed 48 and current 50 can be determined empirically for a known "good" weld at a given pound per hour welding rate. This known information is then used to determine the other parameters. During the welding process it is possible to use the magnitude of the current flow in the weld arc to sense distance between the tip of the tungsten electrode and the surface being welded. This current flow magnitude can then be used in a closed loop control system to adjust the robot position above the surface on a continuous basis, providing a superior quality of weld.

A feedback system 42 is in communication with the controller 38. The feedback system 42 includes, for example, a voltage sensor 56, a force sensor 58, a wire sensor 60 and other sensors 61. The coordinates 36 relating to the initial tool shape can be interrelated to the tool's position on the table 14 using an optically based system using cameras and photogrammetry techniques, or can be based on mechanical probing of the tool 14 using the robot movements and a touch trigger probe.

In one example, the voltage sensor 56 is used to maintain a desired distance between the electrode 28 and the mould 14 such that it corresponds to a desired voltage for a good weld. The force sensor 58 may be provided in one or more joints or locations of the robot 20 and are tripped in the event of a collision between a portion of the robot 20 and the mould 14. The sensitivity of the force sensor 58 can be changed throughout the welding process depending upon, for example, the electrode position.

Turning to FIG. 4, the wire feeder 30 is shown in more detail. The wire feeder 30 includes a spool 100 that feeds wire 102 to electrode 28 in the welding head 26. The spool 100 includes a feature 103, in one example, that cooperates with the wire feed rate sensor 54, such as a proximity sensor, to detect the rate at which the wire 102 is fed to the electrode 28. The wire sensor 60 detects the presence of the wire 102. In the event that the spool 100 runs out of wire, a signal is sent to the controller 38 to generate an error. If the welding head 26 is stationary while the spool 100 continues to feed wire 102, as detected by the wire feed rate sensor 54, an error will be generated.

With continuing reference to FIG. 4, the wire feeder 30 includes locating features for locating the wire 102 relative to the electrode 28 precisely subsequent to servicing the welding head 26. The wire 102 is feed to the electrode 28 through a feed tube 106 that is received in a recess 116 in the side of the welding head 26. The feed tube 106 includes a flange 118 that is located by a slot in the recess 116 to axially position the feed tube 106. An end 108 of the feed tube 106 is received in an aperture 112 in a nozzle 110, which is in communication with the shielding gas 29. In this manner, the location of the wire 102 relative to the electrode 28 can be quickly and repeatably achieved.

The other sensors 61 may include, for example, an optical sensor to determine the position of the electrode 28 relative to the mould 14 and make adjustments to accommodate for a worn mould or other initial tool shape variations such as thermal growth of the tool from the heated table 12. The temperature sensor 44 may also provide feedback to the controller 38 to account for thermal growth of the mould 14 or components of the robot 20 to make adjustments to the desired weld shape or electrode position. Thermal growth of the mould 14 at 700° F. can be as much as a half an inch (12 mm) or more, which significantly impacts the welding path and welding parameters needed to achieve the desired weld shape at the desired location on the mould 14.

Referring to FIGS. 3 and 4, the mould 14 includes a first surface 62 adjacent to second and third surfaces 64, 66. In the example shown, the first surface 62 corresponds to a generally first wall, and the second surface 64 provides an inclined wall 68 relative to the first surface 62. The third surface 66 forms an edge 70 relative to the first surface 62. The desired weld shape is divided into first and second passes 74, 76 that correspond to generally parallel welding planes. The welding parameters 40 are typically chosen to maximize straight line welding speed. A manual welder will lay down adjacent beads in the same direction since it is easier to work from one side of the welder's body. In one example, the system 10 alternates the direction of adjacent weld beads, since it is faster to do so.

The welding parameters 40 are adjusted when a weld bead reaches an inclined wall 68 or an edge 70 to achieve the desired penetration and weld bead shape. For example, the orientation of the welding head 26 may be changed to provide clearance relative to the inclined wall 68. Moreover, it may be desirable to change the orientation of the wire relative to the direction of the weld bead. It may be desirable to increase the current when approaching an inclined wall 68 to ensure desired penetration, while it may be desirable to decrease the current when approaching an edge 70 to prevent roll-off of the weld puddle down the edge or to prevent over penetration.

The second pass 76 is welded on top of the first pass 74. Due to variation in height of the weld bead, the position of each pass is adjusted relative to the previous pass. The voltage between the electrode 28 and mould 14 is monitored by the voltage sensor 56 to maintain a desired distance of the electrode 28 relative to the surface to be welded. The controller 38 may make adjustments to the weld parameters such as reducing or adding passes from the number of passes initially calculated to achieve the desired weld shape.

Referring to FIG. 3, it may be desirable to weld a perimeter 72 on the first surface 62 corresponding to a boundary of the desired weld shape. The perimeter 72 is filled in by multiple, slightly overlapping bead paths 78, 80 to provide a pass of solid material without any voids. However, the perimeter 72 is not welded for the reasons that it is employed in manual welding. The robot 20 has no issues with precisely welding a desired weld shape since it is computer controlled. Instead, it is desirable to first weld a perimeter 72 in the pass to prevent roll-off 83 when making a turn 82 between first and second bead paths 78, 80, which is shown in FIG. 5. Typically, there is too much weld when making the turn 82 such that the weld bead rolls off or flattens undesirably. This will result in an insufficient amount of material at the perimeter of the welded area. Roll-off is not an issue with a skilled manual welder. However, the adjustments needed to prevent roll-off at the boundary of the desired welded shape are difficult to quantify for expression for the robot. When providing a perimeter 72, the roll-off when making the turn 82 between adjoining bead paths 78, 80 is contained by the perimeter 72, as best illustrated in FIG. 5.

Figure 2:
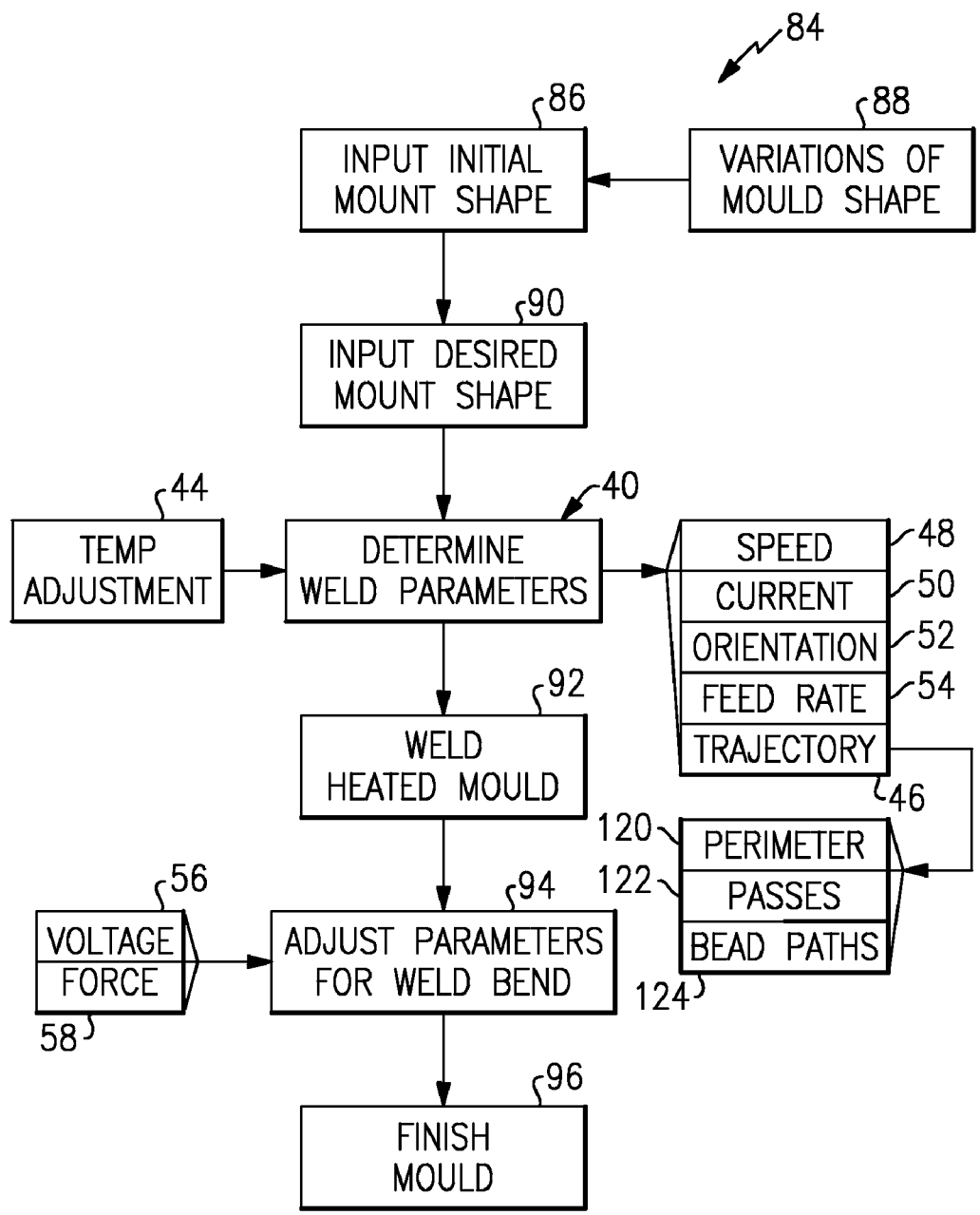
FIG. 2 is a flow chart depicting an example embodiment of a method of welding a tool.

Referring to FIG. 2, a flow chart of an example welding method 84 is illustrated. The initial mould shape is input to the system 10, as indicated in block 86. The initial mould shape is three dimensional digital data, for example. Variations of the mould shape 88 can also be determined, as indicated at block 88. An optical sensor or other device can be used to determine the position and orientation of the mould 14 relative to the robot 14. The variations can correspond to wear to the mould if it has already been in use, pre-welding machining, or thermal growth of the mould. The desired mould shape is input into the system, as indicated at block 90. The desired mould shape corresponds to a reworked mould shape, for example. The weld parameters 40 are determined and include the speed 48, current 50, electrode orientation 52, wire feed rate 54 and electrode trajectory 46, for example. The weld parameters can be adjusted to accommodate temperature 44, to account for thermal growth of the mould 14 and/or robot 20. The trajectory 46 includes the number of passes 122, bead paths 124 (including direction and number of weld beads), and a perimeter 120 corresponds to a boundary of the desired weld shape.

Throughout the welding process, the weld parameters 40 can be adjusted to achieve a desired weld bead, as indicated at block 92. The parameters are adjusted based upon voltage from the voltage sensor 56 and forces from a force sensor 58 that can be indicative of an undesired collision between the electrode 28 and the mould 14.

The desired weld shape corresponds to welded material that is without any voids and capable of providing a class A surface. The welded mould is finish machined, as indicated at block 96, to provide a reworked mould having a class A surface.

Although an example embodiment has been disclosed, a worker of ordinary skill in this art would recognize that certain modifications would come within the scope of the claims. For that reason, the following claims should be studied to determine their true scope and content.

What is claimed is:

1. A method of welding a tool comprising the steps of:
   providing a first set of digital data corresponding to an initial tool shape;
   providing a second set of digital data corresponding to a desired tool shape;
   determining weld path and weld parameters based upon a difference of the first and second sets of digital data, which results in a desired weld shape;
   heating a tool having the initial tool shape;
   adjusting the desired weld path based upon initial tool shape variations, the adjusting step including detecting a position of a heated mould surface indicative of the thermal growth of the tool; and
   automating welding of the tool according to the weld path and weld parameters to provide the desired weld shape to achieve the desired tool shape.

2. The method according to claim 1, wherein the initial tool shape provides a part surface corresponding to a product, and the desired tool shape corresponds to a reworked part surface for the same product.

3. The method according to claim 2, wherein the desired weld shape provides the reworked part surface.

4. The method according to claim 3, comprising the step of finish machining the desired tool shape to provide a class A surface for the reworked part surface.

5. The method according to claim 1, wherein the heating step includes heating the tool above 400° F.

6. The method according to claim 5, wherein the heating step includes heating the tool to approximately 700° F.

7. The method according to claim 1, wherein the detecting step includes mechanically probing the heated mould surface.

8. The method according to claim 1, wherein the detecting step includes optically sensing the heated mould surface.

9. The method according to claim 1, wherein the detecting step includes sensing a temperature associated with the mould.

10. The method according to claim 1, wherein the welding parameters include at least one of a welding speed, a current, an electrode orientation, and a wire feed rate.

* * * * *

UNITED STATES PATENT AND TRADEMARK OFFICE
CERTIFICATE OF CORRECTION

PATENT NO. : 8,367,962 B2
APPLICATION NO. : 11/924649
DATED : February 5, 2013
INVENTOR(S) : Zaffino et al.

It is certified that error appears in the above-identified patent and that said Letters Patent is hereby corrected as shown below:

ON THE TITLE PAGE:

The Assignee should read as follows:

Item (73) Assignee: Dr. Ariel Andre Waitzman, Franklin, MI (US)

Signed and Sealed this
Twenty-eighth Day of May, 2013

Teresa Stanek Rea
*Acting Director of the United States Patent and Trademark Office*